United States Patent
Schneider et al.

(10) Patent No.: US 10,489,751 B2
(45) Date of Patent: Nov. 26, 2019

(54) INFORMATION SYSTEM AND METHOD FOR SELECTING AND REPRODUCING INFORMATION, PARTICULARLY FOR USE IN WORKSHOPS

(71) Applicant: Robert Bosch GmbH, Stuttgart (DE)

(72) Inventors: Klaus Schneider, Ludwigsburg (DE); Joerg Seitter, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 14/899,842

(22) PCT Filed: Apr. 29, 2014

(86) PCT No.: PCT/EP2014/058660
§ 371 (c)(1),
(2) Date: Dec. 18, 2015

(87) PCT Pub. No.: WO2014/202264
PCT Pub. Date: Dec. 24, 2014

(65) Prior Publication Data
US 2016/0140516 A1 May 19, 2016

(30) Foreign Application Priority Data

Jun. 20, 2013 (DE) .................. 10 2013 211 726

(51) Int. Cl.
*G06Q 10/00* (2012.01)
*G06F 16/955* (2019.01)
*G06Q 10/08* (2012.01)

(52) U.S. Cl.
CPC ......... *G06Q 10/20* (2013.01); *G06F 16/9558* (2019.01); *G06Q 10/0875* (2013.01)

(58) Field of Classification Search
CPC .............. G06Q 10/0875; G06Q 10/20; G06F 17/30882; G06F 16/9558
See application file for complete search history.

(56) References Cited

U.S. PATENT DOCUMENTS 5,721,913 A 2/1998 Ackroff et al.
6,330,499 B1 12/2001 Chou et al.
(Continued)

FOREIGN PATENT DOCUMENTS

CN 1675604 A 9/2005
CN 103034676 A 4/2013
(Continued)

OTHER PUBLICATIONS

Godbole, Shantanu, Indrajit Bhattacharya, Ajay Gupta, and Ashish Verma. "Building re-usable dictionary repositories for real-world text mining." In Proceedings of the 19th ACM international conference on Information and knowledge management, pp. 1189-1198. ACM, 2010. (Year: 2010).*
(Continued)

*Primary Examiner* — Jesse P Frumkin
(74) *Attorney, Agent, or Firm* — Norton Rose Fulbright US LLP; Gerard Messina (57) ABSTRACT

An information system has: a component memory for storing component data sets; a component link device for creating component links in the one component link memory; a document memory for storing document data sets; a document link device for linking entries for components for which a component data set exists in the component memory to the corresponding component data set; and a document access device having a document selection device and an evaluation device that is fashioned to (i) identify first component data sets linked to a first document data set, (ii) identify second component data sets linked to the identified first component data sets, and (iii) identify second document data sets linked to the identified second component data sets.

12 Claims, 2 Drawing Sheets

(56) References Cited

U.S. PATENT DOCUMENTS

| | | | |
|---|---|---|---|
| 6,542,799 B2 | 4/2003 | Mizutani et al. | |
| 2008/0140281 A1* | 6/2008 | Morris | G07C 5/008 701/31.4 |
| 2008/0208609 A1* | 8/2008 | Preece | G06Q 10/06 705/1.1 |
| 2009/0006476 A1* | 1/2009 | Andreasen | G06Q 50/30 |
| 2009/0193053 A1 | 7/2009 | Swart | |
| 2009/0259358 A1* | 10/2009 | Andreasen | G07C 5/0808 701/31.4 |
| 2010/0262332 A1* | 10/2010 | Gilbert | G06Q 10/06 701/29.6 |
| 2011/0112932 A1* | 5/2011 | Chen | G06Q 10/20 705/27.1 |
| 2011/0288954 A1* | 11/2011 | Bertosa | G06Q 30/0639 705/26.9 |
| 2012/0011073 A1* | 1/2012 | Rajpathak | G06F 16/355 705/305 |
| 2013/0346433 A1* | 12/2013 | Bascom | G06F 17/30882 707/758 |
| 2014/0358357 A1* | 12/2014 | Jones | G07C 5/0816 701/31.4 |
| 2016/0085864 A1* | 3/2016 | Morimoto | G06Q 10/20 707/769 |
| 2016/0117368 A1* | 4/2016 | Merg | G07C 5/006 707/777 |

FOREIGN PATENT DOCUMENTS

| | | |
|---|---|---|
| DE | 195 23 483 | 1/1997 |
| DE | 103 23 390 | 12/2004 |
| GB | 2 472 736 | 2/2011 |
| WO | WO 98/27505 | 6/1998 |

OTHER PUBLICATIONS

International Search Report for PCT/EP2014/058660, dated Aug. 28, 2014.

* cited by examiner

INFORMATION SYSTEM AND METHOD FOR SELECTING AND REPRODUCING INFORMATION, PARTICULARLY FOR USE IN WORKSHOPS

BACKGROUND OF THE INVENTION

1. Field of the Invention

The present invention relates to an information system and to a method for selecting and reproducing information, e.g., for supporting employees in motor vehicle workshops.

2. Description of the Related Art

In the existing art, information systems are known that provide, on request, employees in a workshop with information relevant for diagnosis and repair of motor vehicles.

Published German patent application document DE 195 23 483 A1 discloses a computer-supported error diagnosis unit for a complex system, suitable in particular for motor vehicles, and containing a knowledge base having a structure model, a function model, and a fault model.

Published German patent application document DE 103 23 390 A1 describes a human-machine interface (HMI) for a diagnostic system for diagnosing a technical system having a knowledge base and a diagnostic program that provides a first diagnostic result in the form of an initial data packet, having a data converter that, on the basis of a converter configuration, converts the initial data packet into an XML structure and stores it as an XML data file, a data completion unit that analyzes the data of the XML data file and, on the basis of the data of the initial data packet, or after a manual request has been made, reads out further data from the technical system to be diagnosed, and, after a conversion using a completer configuration, stores the XML data file, and having a visualization of the XML elements stored in the XML data file, in the form of an interactive user interface.

Further information management systems and/or diagnostic systems, in particular for use in workshops, are disclosed in US Patent Application Publication 2009/193053, U.S. Pat. Nos. 6,330,499, and 6,542,799.

BRIEF SUMMARY OF THE INVENTION

The object of the present invention is to optimize the selection and reproduction of information stored in a database, in particular diagnostic and/or repair information for motor vehicle workshops, and to provide a suitable, improved information system for this purpose.

An information system according to the present invention, provided in particular for use in a motor vehicle workshop, has at least one component memory fashioned for the storage of component data sets, and at least one component link memory fashioned for storing component links between at least two component data sets; a component link device that is fashioned to create at least one component link in the component link memory, each component link linking at least two component data sets to one another; at least one document memory fashioned for the storage of document data sets, and at least one document link memory fashioned for storing at least one document link between at least one document data set and at least one component data set; and a document link device that is fashioned to identify, in the document data sets, entries for components for which at least one component data set exists in the component memory, in particular on the basis of their semantic labeling, and, in the document link memory, to create a document link to the corresponding component data set.

For this purpose, the document link device has a comparator device that is fashioned to compare entries in the document data sets with entries in the component data sets, and the document link device is fashioned to create, in at least one document link memory, a document link between the respective document data set and the corresponding component data set if the comparator device has determined an agreement between the entries.

The information system according to the present invention additionally has a document access device having at least one input device that is fashioned to receive at least one input; a document selection device fashioned to select, on the basis of at least one input, one or more first document data sets from the document memory; and an evaluation device.

The evaluation device is fashioned to identify, in a first step, first component data sets that are linked to the at least one first document data set; and in a second step to identify second component data sets linked to first component data sets identified in the first step; and in a third step to identify second document data sets linked to the second component data sets identified in the second step.

The present invention also includes a method of creating and/or administrating an information system according to the present invention, the method including the creation in the component memory of at least one component data set, and the linking of the newly created component data set to at least one other component data set created in the component memory; and/or the creation of at least one document data set in the document memory, and the comparison of entries in the newly created document data set with the entries in the component data sets, and, if an agreement is determined between at least one entry in the document data set and at least one entry in one of the component data sets, to create a document link between the respective document data set and the corresponding component data set.

In addition, the present invention also includes a method for selecting information from an information system, the method including, in a first step, the selection of at least one first document data set; in a second step, the identification of at least one first component data set linked to the at least one first document data set; in a third step, the identification of at least one second component data set linked to the identified first component data sets, and, in a fourth step, the identification of at least one second document data set linked to the identified second component data sets.

The identification and assignment of entries in the documents that designate components for which entries exist in the component memory takes place according to the present invention on the basis of their semantic labeling, i.e. the use of defined terms for the components, the terms being used in uniform fashion both in the component data sets and in the document data sets. As a result, fixed links, which would correspond to an "href reference" in HTML, can be completely done without. The results are described semantically clearly both in terms of content and also in their interaction, i.e. through incoming and outgoing links.

This method is particularly advantageous when there is a very large number of possible links (references from document A to B) that can be specified/implemented technically only with a high outlay (high cost/benefit expense), and in addition the user is not to be overloaded with a high number of links.

Theoretically, between n objects $(n^2-n)/2$ links can be defined. Even if, in reality, not all theoretically conceivable relations have a meaning, the number of links increases quadratically as the quantity of objects/documents.

A further advantage of the document links according to the present invention based on semantic labels is that manual administration of historic documents, connected with a high outlay in particular when the scope and thus the navigation possibilities of documents increase, can be completely done without.

In a specific embodiment, the information system additionally has a device for determining a relevance value that is fashioned to provide at least one relevance value to each of the selected document data sets.

The display device is then fashioned to display the document data sets as a function of their relevance value. This facilitates the perception and absorption of the information provided by the information system by the user, because the most important information, having the highest relevance, can be displayed to the user first and/or in particularly conspicuous fashion, and the user himself does not have to determine which of the offered information is particularly important in the current context.

The display device can in particular be fashioned such that it displays only document data sets whose relevance is greater than a specifiable threshold value. In this way, the user can concentrate on the most important information, and is not distracted by the display of a large amount of unimportant information.

In a specific embodiment, the relevance threshold value can be inputted and/or modified via a relevance threshold value input device, so that the user can correspondingly adjust the quantity of displayed information by modifying the threshold value so as to correspond to his current requirements.

Alternatively or in addition, the selected document data sets can be displayed in increasing or decreasing order according to their relevance value.

The information system can in addition include a history memory that contains a history of previously selected component data sets. In this case, the relevance value determination device can be fashioned to determine the relevance value on the basis of the history of the previously identified component data sets, as stored in the history memory. The relevance of a document data set can in particular be determined on the basis of the number of its document links with the previously identified component data sets.

In a specific embodiment, the information system has in addition at least one diagnostic device connected to the evaluation device. The evaluation device is fashioned to carry out an input to the information system, on the basis of the diagnostic steps previously carried out, in order to select document data sets in the context of the diagnostic steps previously carried out, and, possibly on the basis of the selected document data sets, to automatically carry out further diagnostic steps and/or repair steps. This makes it possible to further automate and to accelerate the diagnosis and/or repair.

In a specific embodiment, the component link device has an input device that makes it possible to link component data sets to one another through a manual input. In this way, links between the component data sets can be carried out manually and/or corrected by human experts (authors).

In a specific embodiment, the component link device is fashioned to automatically link component data sets to one another on the basis of specifiable criteria. In this way, the linking of component data sets can be automated and accelerated; in particular, a manual linking, which is intensive in terms of personnel, time, and costs, can be limited to corrections and special cases.

For this purpose, the component linking device is fashioned in particular to compare entries in a first component data set with entries in other component data sets, and, if an agreement is determined between at least one entry in the first component data set with at least one entry in a second component data set, to create, in the component link memory, a component link between the first component data set and the second component data set.

The document memory can also include at least one document marking memory that can be assigned to an entry in a document and is fashioned for storing at least one document marking value. Such a document marking memory makes it possible to define various classes of entries and, when creating a document with the aid of a document creating device, to assign at least one of the classes to an entry in the document by manually setting at least one document marking value in a document marking memory assigned to the entry in the document.

The link memory can also include at least one link marking memory that can be assigned to a document link and is fashioned to store at least one link marking value. Link marking memories make it possible to define various link classes of document markings, and to assign a document link to one of the link classes by setting at least one link marking value in a link marking memory assigned to the document link.

For this purpose, the document link device is fashioned such that, when the comparator device has determined an agreement between an entry in a document data set and an entry in a component data set and a document marking memory has been assigned to the entry in the document data set for which an agreement has been determined, the document link device assigns a link marking memory to the document link created on the basis of the agreement and stores, in the link marking memory assigned to the document link, a value from the document marking memory that is assigned to the entry of the document data set for which an agreement has been determined.

A first link class can for example contain document links of documents with component data sets that relate to components that are described in the respective document data set, i.e. that are the subject matter of the description of the document data set.

A second link class can include document links to those component data sets that relate to components that are mentioned in the respective document data set without being described there.

DETAILED DESCRIPTION OF THE INVENTION

Figure 1:
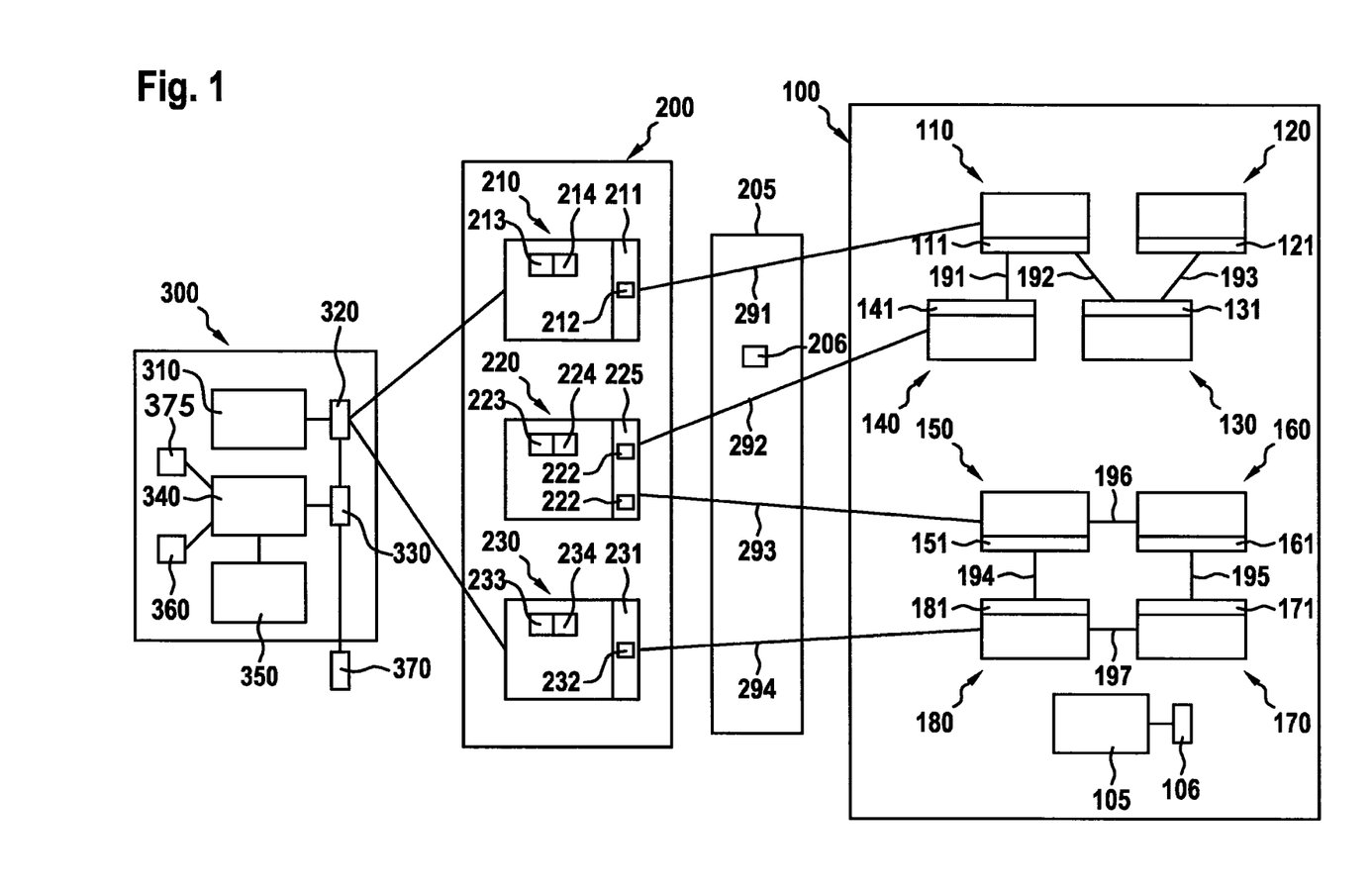
FIG. 1 shows a schematic representation of an exemplary embodiment of an information system according to the present invention.

FIG. 1 shows a schematic representation of an exemplary embodiment of an information system according to the present invention.

An information system according to the present invention has at least one component memory 100 in which component data sets 110, 120, 130, 140, 150, 160, 170, 180 are stored. Component data sets 110, 120, 130, 140, 150, 160, 170, 180 contain information about at least one component, for example a throttle valve of a motor vehicle. The information system also includes at least one component link memory 121, 131, 141, 151, 161, 171, 181, provided for storing at least one component link 191-197. A component link 191-197 links at least two component data sets 110, 120, 130, 140, 150, 160, 170, 180 stored in component memory 100 to one another.

In order to produce component links 191-197 between component data sets 110, 120, 130, 140, 150, 160, 170, 180, the information system has in particular a component link device 105 that is fashioned to select two or more component data sets 110, 120, 130, 140, 150, 160, 170, 180 and to link them to one another by creating, in component link memories 111, 121, 131, 141, 151, 161, 171, 181 of component data sets 110, 120, 130, 140, 150, 160, 170, 180 that are to be linked to one another, in each case a component link to a data set 110, 120, 130, 140, 150, 160, 170, 180 that is to be linked.

The linking can take place on the basis of various specifiable criteria. A possible criterion for a component link is the criterion "contains," according to which a component data set 110, 120, 130, 140, 150, 160, 170, 180 is linked to those component data sets 110, 120, 130, 140, 150, 160, 170, 180 that are assigned to components that are contained in the component 110, 120, 130, 140, 150, 160, 170, 180 described by a first component data set 110, 120, 130, 140, 150, 160, 170, 180.

If, for example, first component data set 110 is for example component data set 110 assigned to the engine of a motor vehicle, then this first component data set 110 is linked, on the basis of the "contains" criterion, to further component data sets 130, 140 that relate for example to a crankshaft, cylinder heads, intake and or outlet valves, injection valves, ignition devices, etc.

Alongside or instead of the "contains" link, other link criteria, such as for example the criterion "is connected to," are possible. Component data sets 110, 120, 130, 140, 150, 160, 170, 180 for synonymous terms designating the same component can also be linked together on the basis of an additional criterion "is synonymous."

Component link device 105 is in particular also connected to an input device 106 that makes it possible to input and/or select link criteria manually. Input device 106 can also be fashioned so as to make it possible for a user to manually carry out, delete, and/or correct component links 191-197 between component data sets 110, 120, 130, 140, 150, 160, 170, 180.

If additional component data sets 110, 120, 130, 140, 150, 160, 170, 180 for further components are created in component memory 100, component links 191-197 of the new component data sets 110, 120, 130, 140, 150, 160, 170, 180 to the component data sets 110, 120, 130, 140, 150, 160, 170, 180 already present in component data memory 100 can be produced immediately upon creation of the new component data set 110, 120, 130, 140, 150, 160, 170, 180, or also later, manually and/or in automated fashion.

Ideally, the content of component memory 100 is complete in the sense that it contains, for all components possibly present in the area of use of the information system, at least one component data set 110, 120, 130, 140, 150, 160, 170, 180, and contains all relevant component links 191-197 between component data sets 110, 120, 130, 140, 150, 160, 170, 180 stored in component memory 100.

The information system also has a document memory 200 in which document data sets 210, 220, 230 are stored. Here, each of the document data sets 210, 220, 230 has at least one document link memory 211, 221, 231 provided for storing at least one document link 291, 292, 293, 294 between a respective document data set 210, 220, 230 and at least one component data set 110, 120, 130, 140, 150, 160, 170, 180 in component memory 100.

Document memory 200 additionally has at least one document marking memory 214, 224, 234. Each document marking memory 214, 224, 234 can be assigned to an entry 213, 223, 233 in a document data set 210, 220, 230, and is fashioned for storing at least one document marking value. Such a document marking memory 214, 224, 234 makes it possible to define various classes of entries and, during creation of a document 210, 220, 230 with the aid of a document creating device, to assign the respective entry to at least one of the classes through manual setting of at least one document marking value in a document marking memory 214, 224, 234 that is assigned to an entry in a document 210, 220, 230.

A first class can for example include entries 213, 223, 233 that relate to components described in the respective document data set 210, 220, 230, i.e., that are the subject matter of the description of the respective document data set 210, 220, 230.

A second class can include entries 213, 223, 233 that relate to components that are mentioned in the respective document data set 210, 220, 230 without being described there.

The at least one document link memory 211, 221, 231 additionally includes at least one link marking memory 212, 222, 225, 232 that can be assigned to a document link 291, 292, 293, 294 and is fashioned for storing at least one link marking value. Such link marking memories 212, 222, 225, 232 make it possible to define various link classes of document links 291, 292, 293, 294, and to assign at least one document link 291, 292, 293, 294 to at least one of the link classes. The assignment takes place by assigning one of the link marking memories 212, 222, 225, 232 to a document link 291, 292, 293, 294, and storing at least one link marking value in the link marking memory 212, 222, 225, 232 assigned to the document link 291, 292, 293, 294.

A first link class can for example contain document links 291, 292, 293, 294 to component data sets 110, 120, 130, 140, 150, 160, 170, 180 that relate to components that are described in the respective document data set 210, 220, 230, i.e., that are the subject matter of the description of the document data set 210, 220, 230.

A second link class can include document links 291, 292, 293, 294 to those component data sets 110, 120, 130, 140, 150, 160, 170, 180 that relate to components that are mentioned in the respective document data set 210, 220, 230 without being described there.

The information system also includes a document link device 205 having a comparator device 206 that is fashioned to analyze the content of document data sets 210, 220, 230, and in particular to compare the content of document data sets 210, 220, 230 with the content of component data sets 110, 120, 130, 140, 150, 160, 170, 180 in order to create, for components mentioned in one of the document data sets 210, 220, 230, a document link 291, 292, 293, 294 with the component data set 110, 120, 130, 140, 150, 160, 170, 180 assigned to the respective component, in the respective document link memory 211, 221, 231.

Document link device 205 can be fashioned such that, when comparator device 206 has determined an agreement between an entry 213, 223, 233 in a document data set 210, 220, 230 and an entry 113, 123, 133, 143, 153, 163, 173, 183 in a component data set 110, 120, 130, 140, 150, 160, 170, 180 and a document marking memory 214, 224, 234 is assigned to the entry 213, 223, 233 in the document data set 210, 220, 230 for which the agreement has been determined, the document link device assigns a link marking memory 212, 222, 225, 232 to the document link 291, 292, 293, 294 created on the basis of the determined agreement, and stores, in the link marking memory 212, 222, 225, 232 assigned to the document link 291, 292, 293, 294, a value from the document marking memory 214, 224, 234 assigned to the entry 213, 223, 233 of the document data set 210, 220, 230 for which the agreement has been determined.

Thus, according to the present invention the linking takes place, differing from the existing art, not in that the user or author creates, when creating a document data set 210, 220, 230, a fixed link of an element in the document data set 210, 220, 230 with at least one component data set 110, 120, 130, 140, 150, 160, 170, 180, but rather in that document link device 205 analyzes document data sets 210, 220, 230 in document memory 200; identifies components that are contained in at least one of the component data sets 110, 120, 130, 140, 150, 160, 170, 180 and are mentioned, and in particular described, in at least one of the document data sets 210, 220, 230 on the basis of their clear semantic labeling, i.e. in that exclusively defined designations are used for the individual components, and creates, in document link memory 211, 221, 231 assigned to the respective document 210, 220, 230, a document link 291, 292, 293, 294 to the component data set 110, 120, 130, 140, 150, 160, 170, 180 associated with the respective component.

The creation of document links 291, 292, 293, 294 is in this way simplified compared to the existing art, and can in particular be automated. The authors of documents 210, 220, 230 are in this way relieved of the task of themselves having to create suitable document links 291, 292, 293, 294.

In addition, the flexibility of the information system is increased, because the evaluation of document data sets 210, 220, 230 can be adapted to current, changing conditions; and in particular component links to component data sets 110, 120, 130, 140, 150, 160, 170, 180 newly created in component memory 100 can also be produced rapidly and reliably, and in particular automatically.

An information system according to the present invention also has a document access device 300 that is fashioned to enable a user to have access to the document data sets 210, 220, 230 stored in document memory 200 and to the component data sets 110, 120, 130, 140, 150, 160, 170, 180 stored in component memory 100, and to make their content available to the user.

For this purpose, document access device 300 has at least one input device 310 that is fashioned to accept at least one input, which can be for example a search request from a user or an input from a diagnostic device.

Document access device 300 has in addition a document selection device 320 that is fashioned to select, on the basis of the at least one input (e.g. a search request), one or more document data sets 210, 220, 230 from document memory 200. In particular, document data sets 210, 220, 230 are selected that appear particularly relevant with regard to the current context specified by the input. The determination of the relevance of document data sets 210, 220, 230 is described in detail below with reference to FIG. 2.

After in this way a set of first documents 210, 230 has been selected, document link memories 211, 231 of the selected first documents 210, 230 are evaluated in order to identify those component data sets 110, 180 in component memory 100 as first component data sets 110, 180 that are linked to at least one of the first selected document data sets 210, 230.

Document selection device 300 then identifies second component data sets 130, 140, 150, 170 in component memory 100 that are linked to first component data sets 110, 180, and second documents 220 that are linked to these second component data sets 130, 140, 150, 170.

In this way, through an output device 350 that is also a component of document access device 300, in a first step not only contents of the document data sets 210, 230 selected by document selection device 320, resulting immediately from the search request inputted via input device 310, are displayed, but rather it is also possible to display second document data sets 220 that are linked to one another through first and second component data sets 110, 120, 130, 140, 150, 160, 170, 180 that are named in the respective document data sets 210, 220, 230 and are linked to one another in component memory 100, so that information contained in second document data sets 220 that does not result immediately from the original input (search request) is additionally displayed to the user, and can be made available in order to facilitate further work, in particular diagnosis and/or repair.

Between evaluation device 330 and display device 350, in addition a relevance value determining device 340 can be provided that provides the document data sets 210, 220, 230 selected by evaluation device 330 with a relevance value on the basis of specified or specifiable criteria.

For this purpose, the information system can in particular include a history memory 375 that contains the history of previously selected document data sets 210, 220, 230, and relevance value determining device 340 is fashioned to determine the relevance value of a document data set 210, 220, 230 on the basis of the history of the previously identified component data sets 110, 120, 130, 140, 150, 160, 170, 180, in particular on the basis of the number of document links 291, 292, 293, 294 of document data set 210, 220, 230 with the previously identified component data sets 110, 120, 130, 140, 150, 160, 170, 180.

Output device 350 is fashioned to output or display the selected document data sets 210, 220, 230 in accordance with their respective relevance value, and/or to output or display only those document data sets 210, 220, 230 whose relevance value exceeds a specified value. In this way, the output can be concentrated on the most important information and thus made easier to survey. In particular, via a relevance threshold value input device 360 a relevance threshold value can be specified that has to be exceeded in order for information from a corresponding document data set 210, 220, 230 to be outputted by output device 350.

In addition, document data sets 210, 220, 230 selected in this way can also contain instructions or proposals for additional diagnostic and/or working steps, displayed on output device 350 or carried out by a suitably fashioned diagnostic device 370 that is functionally connected to evaluation device 330, after confirmation by the user if warranted. The results of such additional diagnostic steps can be supplied to input device 310, and in this way can act as new input values for an additional document selection by document selection device 320.

In this way, the user can be effectively guided by the information system through a complete diagnosis and/or repair, and/or the diagnosis or repair can, given a corresponding coupling of the diagnostic system to a suitable diagnostic device 370, take place in largely automated fashion, in that diagnostic device 370 communicates its measurement or diagnostic results to the information system and the information system selects, on the basis of the measurement and/or diagnostic results, suitable document data sets 210, 220, 230 that contain instructions or proposals for further diagnostic steps that can then be carried out automatically by diagnostic device 370.

In the following, a concrete applied example is described of an information system according to the present invention for motor vehicle diagnosis.

For the following description, it is assumed that all information and functions necessary for diagnosis, repair, and carrying out maintenance work on a motor vehicle are present in document memory 200 in a number of document data sets 210, 220, 230 that are distinguished in being structured according to the present invention and, as described in connection with FIG. 1, are linked to component data sets 110, 120, 130, 140, 150, 160, 170, 180 that are stored in component memory 100 and that describe motor vehicle components.

Document data sets 210, 220, 230 each have at least one title and are classified into various content types by their titles. The content types include for example: test sequence, system error environment, assignment of symptoms, information about warnings, diagram of electrical terminals, installation position, description of installation and removal, technical description, torque specification, assignment of terminals, hydraulic and/or pneumatic connection diagrams, ECU communication, and reading out of current values.

Each of these content types can accept, inter alia, the following contents: structured text (paragraphs, tables, lists, and many more); images; and active contents (e.g. the use of functions of the control device communication via the communication interface of the vehicle).

Each of the document data sets 210, 220, 230 contains at least one semantically labeled reference to at least one component that is the subject matter of a component data set 110, 120, 130, 140, 150, 160, 170, 180 in component memory 100. The sum of the data stored in component memory 100 and the data stored in document memory 200 ideally completely maps the fundamental vehicle ontology; i.e., all vehicle components and systems, functions of the control device communication (reading out actual values, controlling actuating elements, reading out error codes from the control devices of the vehicle), error and DTC codes.

In the following it is described how—i.e. in what sequence, in what contexts, and with which priorities—the above-named document data sets 210, 220, 230 are presented to the user of a document access device 300 according to the present invention:

A first task of document access device 300 is to process user inputs that have been inputted via input device 310 in order to select document data sets 210, 220, 230 that match the inputs, for example that respond to an inputted user query, and to display the contents of selected document data sets 210, 220, 230 on a display device 350. Here, if warranted, semantic labels present in document data sets 210, 220, 230 are replaced by contents from component data sets 110, 120, 130, 140, 150, 160, 170, 180 that are linked to the respective document data set 210, 220, 230.

Via the input, document access device 300 gains initial knowledge, referred to as "context," concerning the desire of the user and/or the current problematic.

As an example, assume that the user desires information concerning vehicle diagnosis in order to find one or more faults in the vehicle.

For this purpose, document access device 300 evaluates document data sets 210, 220, 230 stored in document memory 200, as follows:

In a first step, all document data sets 210, 220, 230 are rejected whose content type does not make a contribution to the given task/user input; in the described example, those whose content type is not primarily relevant for vehicle diagnosis. Examples of this may be information concerning order numbers and delivery times for replacement parts. All document data sets 210, 220, 230 having this content type are no longer considered in the following, but rather are filtered out.

As a result, there remain document data sets 210, 220, 230 that are potentially necessary or at least helpful for vehicle diagnosis.

If no further more specific user information is present, document access device 300 will now prioritize, i.e. assign a higher priority to, those document data sets 210, 220, 230 that are generally valid and therefore relate to a large number of cases of diagnosis and error, such as for example technical descriptions of known vehicle systems.

For this purpose, in document memory 200 all document links 291, 292, 293, 294 of document data sets 210, 220, 230 to component data sets 110, 120, 130, 140, 150, 160, 170, 180 in component memory 100 are sought that are marked as "descriptive" in their respective marking memory 212, 222, 225, 232.

In a second step, a high priority is assigned to those of the sought document data sets 210, 220, 230 that describe complex systems (e.g. the injection system or exhaust system of a motor vehicle).

In a third step, a low priority is assigned to those of the sought document data sets 210, 220, 230 that describe simple components (such as a lambda sensor).

The selection produced in this way of document data sets 210, 220, 230, and their assigned priorities, thus results from the current context (in the example described here, the context "diagnosis").

If the user now selects, from the contents of a document data set 210, 220, 230 presented by output device 350, one of the components named there, the context is then additionally limited to this component.

In the following, this is explained as an example for the case in which, in the context "diagnosis," the user has selected the "lambda sensor."

The ontology stored in component memory 100 through component links 191-197 between component data sets 110, 120, 130, 140, 150, 160, 170, 180 defines the lambda sensor as an electrical component in the exhaust train.

For the new context, document access device 300 carries out a new selection of document data sets 210, 220, 230.

Here, in document memory 200 all document data sets 210 are sought that contain, in the respective marking memory 212, document links 291 characterized as "descriptive" in component memory 100 to a component data set 110 assigned to the "lambda sensor." Because the lambda sensor is an "electrical component," on the basis of the linking of the component data set "lambda sensor" 110 to further component data sets 130, 140, further document data sets 220 are selected that also have a reference to the electrical system, e.g. circuit plans, test sequences, or functions that can read out the current actual value of the sensor. Because the lambda sensor is a component in the exhaust train, on the basis of the link of component data set 110 "lambda sensor" to further component data sets 110, 120, 130, 140, 150, 160, 170, 180, if warranted further document data sets 210, 220,

230 are also selected (not shown in FIG. 1) that also have a reference to the exhaust train.

The selection produced in this way of document data sets 210, 220, 230 and their priorities thus results from the modified current context, which, alongside the keyword "diagnosis," now also contains the keyword "lambda sensor."

The user input takes place through the selection of a semantically distinguished element (here: "lambda sensor"). If the user now carries out a test sequence for the lambda sensor, the context is again modified, this time by the keyword "test sequence."

Document access device 300 can now infer from the modified context that, after a component test, the removal and/or replacement part ordering of a "lambda sensor" may be advisable for the user.

Therefore, as a consequence all documents are prioritized that describe a lambda sensor and that are presumed to support activities resulting from the diagnosis. Examples include: installation and/or removal instructions, replacement part order numbers, manufacturer information, etc.

The applied example described here serves as representative for the set of all possible navigation paths that result from the current context and the available document data sets 210, 220, 230.

The functioning of document access device 300 is here generic, i.e., it follows fixed rules defined ahead of time, the user inputs, and the current context.

Here the navigation is carried out by the user and is not structurally specified by the authors of the documents. Technically, the selection of the data can take place using a database query language, such as SQL, using the data model and in particular the semantic relations.

The system of rules can be present either as program code/a sequence of SQL statements within the execution unit, or can be specified by suitable technologies, e.g. OWL.

Figure 2:
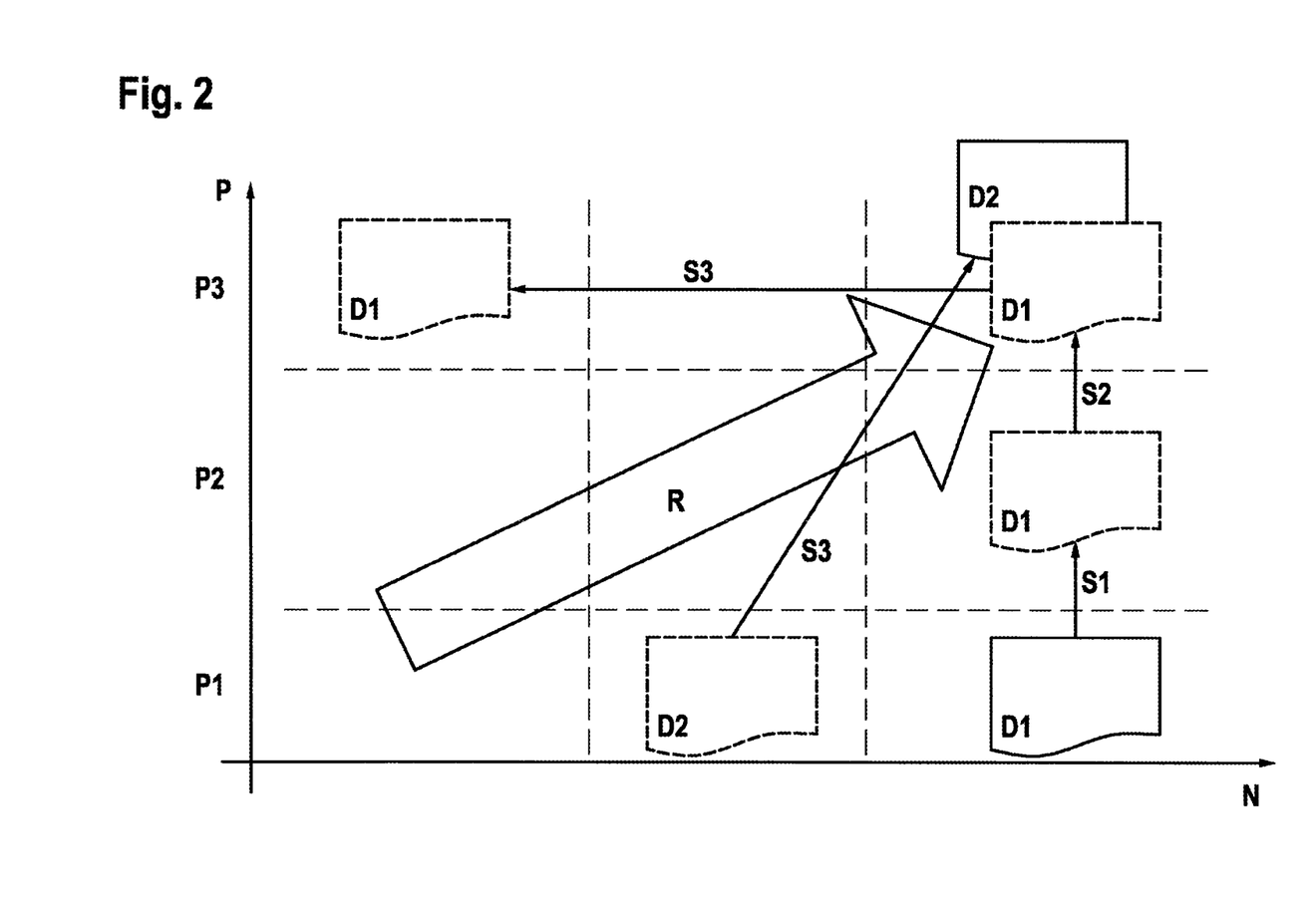
FIG. 2 schematically shows the sequence of the continuing determination of the relevance of documents in a changing context.

With reference to FIG. 2, the procedure is described in the following from the point of view of a test sequence document D1 that contains instructions for testing the lambda sensor.

On the x-axis of the coordinate system shown in FIG. 2, the functional necessity N of a document D1, D2 in the current context is plotted, and on the y-axis the current priority P of document D1, D2 is plotted. The current relevance R of a document D1, D2 is here proportional to its distance from the origin of the coordinate system, which is a function both of the functional necessity N and of the priority P.

If the user starts a diagnostic process in the vehicle, and does not specify any further details, document D1 is rated as "functionally necessary", and is therefore situated at the far right in the coordinate system. However, it has only a low priority P1, so that in the coordinate system it is situated close to the x-axis.

That is, document D1 can in principle be useful to the client in the search for an error. It is displayed to the user as existing, but is not prioritized.

If, in step S1, the user now opens a further document, not shown in FIG. 2, e.g. describing the "engine controlling," then the relevance R increases of document D1, describing the test sequence of the lambda sensor, because the component "lambda sensor" is part of the "engine controlling."

The functional relevance N of document D1 remains unchanged here, but its priority P increases. As a consequence, in the coordinate system shown in FIG. 2 document D1 "test sequence lambda sensor" moves from priority level P1, "existent," upward to priority level P2, "priority."

If, in a further step S2, the user then also examines a circuit plan of the "engine controlling," and selects the component "lambda sensor," the relevance of document D1, "test sequence of the lambda sensor," increases again. Document D1 is now rated at priority level P3, "high priority," and thus comes into the focus of attention of the user.

If, in a next step S2, the user carries out a test sequence as a result of which "lambda sensor not defective" is determined, the functional relevance of document D1 then falls away, because it can no longer supply any functional contribution for the user; however, a high priority level P3 continues to be present, because document D1 continues to fit the current context very precisely.

D1 now moves (to the left in the coordinate system) out of the client's focus, because it has become functionally irrelevant. In its place, another document D2 can now become highly relevant.

Documents D1, D2 control their representation and priority in relation to the attention of the user himself; in doing so they react to the context, and are thus also controlled via their functional relevance.

What is claimed is:

1. An information system for diagnosing a vehicle in a motor vehicle workshop, comprising:
   at least one component memory for storing component data sets of a vehicle component of the vehicle;
   at least one component link memory for storing component links between at least two component data sets;
   a component link device to provide, in the at least one component link memory, at least one component link which links at least two component data sets to one another;
   a document memory for storing document data sets of the vehicle components;
   at least one document link memory for storing at least one document link between at least one document data set of at least one vehicle component of the vehicle components and at least one component data set of the at least one vehicle component of the vehicle components;
   a document link device including a comparator device to compare entries in the document data sets with entries in the component data sets of the vehicle components, wherein the document link device provides, in at least one document link memory, a document link between the at least one document data set and the at least one component data set when the comparator device has determined an agreement between at least one entry in the document data sets and at least one entry in the component data sets of the vehicle components; and
   a document access device, including:
      at least one input device to accept at least one input; and
      a document selection device to select, based on the at least one input, at least one first document data set from the document memory;
      an evaluation device to perform the following:
         i) identify at least one first component data set linked to the at least one first document data set;
         ii) identify at least one second component data set linked to the identified at least one first component data set; and
         iii) identify at least one second document data set linked to the identified at least one second component data set; and
      at least one display device to display information from at least one of the selected at least one first document data set, at least one second document data set, the identified at least one first component data set, and the identified at least one second component data set;

wherein the document data set having the document link is a linked document data set and is used to diagnose and/or repair the vehicle, and wherein the component links are based on relationships between the vehicle components.

2. The information system as recited in claim 1, further comprising:

a relevance value determination device to assign a relevance value to each of the at least one first document data set and the at least one second document data set;

wherein the display device is configured to display at least one of the at least one first document data set and the at least one second document data set as a function of respective relevance values.

3. The information system as recited in claim 2, wherein the display device is configured to at least one of (i) display the at least one first document data set and the at least one second document data set in the order according to the respective relevance values, and (ii) display only document data sets having a relevance value greater than a specified relevance threshold value.

4. The information system as recited in claim 2, further comprising:

a history memory storing a history of previously identified component data sets;

wherein the relevance value determining device is configured to determine the relevance value of a specific document data set on the basis of the number of document links of the specific document data set to the previously identified component data sets.

5. The information system as recited in claim 2, further comprising:

at least one diagnostic device connected to an evaluation device to automatically carry out at least one diagnostic step on the basis of at least one of the selected at least one first document data set and the selected at least one second document data set.

6. The information system as recited in claim 2, wherein the component link device has an input device that enables linking component data sets to one another through manual input, by providing, in the component link memory, a component link between the at least one first component data set and the at least one second component data set.

7. The information system as recited in claim 2, wherein the component link device is configured to compare entries in the at least one first component data set to entries in at least one other component data set, and, if an agreement is determined between at least one entry in the at least one first component data set and at least one entry in the at least one second component data set, to create in the component link memory a component link between the at least one first component data set and the at least one second component data set.

8. The information system as recited in claim 2, wherein the document memory additionally has at least one document marking memory configured to be selectively assigned to an entry in at least one of the at least one first document data set at the at least one second document data set, and is configured to store at least one document marking value.

9. The information system as recited in claim 8, wherein the at least one document link memory additionally includes at least one link marking memory configured to be selectively assigned to a document link and configured to store at least one link marking value.

10. The information system as recited in claim 9, wherein the document link device is configured such that: if (i) the comparator device has determined an agreement between an entry in a document data set and an entry in a component data set, and (ii) a document marking memory is assigned to the entry in the document data set for which an agreement has been determined, a link marking memory is assigned to the document link which was created on the basis of the agreement, and a value from the document marking memory assigned to the entry of the document data set for which the agreement was determined is stored in the link marking memory assigned to the document link.

11. A method for operating an information system for diagnosing a vehicle in a motor vehicle workshop, the method comprising:

creating and storing, via a processor, at least one component data set of at least one vehicle components of the vehicle in a component memory;

operating a component link device, in the at least one component link memory, so as to provide at least one component link which links the at least one created component data set of the at least one vehicle components and at least one other component data set of another one of the at least one vehicle components in the component memory;

storing document data sets in a document memory;

storing, via at least one document link memory, at least one document link between at least one document data set of the at least one vehicle components and at least one component data set of the at least one vehicle components; and comparing, via a comparator device of a document link device, entries in the document data sets with entries in the component data sets of the at least one vehicle components;

providing, via the document link device, in at least one document link memory, a document link between the at least one document data set and the at least one component data set of the at least one vehicle components when the comparator device has determined that there is agreement between at least one entry in the document data sets of the at least one vehicle components and at least one entry in the component data sets of the at least one vehicle components;

diagnosing the vehicle using the document data set having the document link which is a linked document data set, wherein the document link device analyzes the document data set in the document memory; identifies the vehicle components that are contained in at least one of the component data sets and are in at least one of the document data sets based on exclusively defined designations used for the vehicle components, and creates, in the document link memory assigned to the respective document, a document link to the component data set associated with the respective vehicle components, wherein there is at least one input device to accept at least one input, and wherein there is a document selection device to select, based on the at least one input, at least one first document data set from the document memory, wherein the information system includes a document access device, including:

at least one input device to accept at least one input; and a document selection device to select, based on the at least one input, at least one first document data set from the document memory;

an evaluation device to perform the following:
   i) identify at least one first component data set linked to the at least one first document data set;
   ii) identify at least one second component data set linked to the identified at least one first component data set; and
   iii) identify at least one second document data set linked to the identified at least one second component data set; and at least one display device to display information from at least one of the selected at least one first document data set, at least one second document data set, the identified at least one first component data set, and the identified at least one second component data set;

wherein the document data set having the document link is a linked document data set and is used to diagnose and/or repair the vehicle, and wherein the component links are based on relationships between the vehicle components.

12. The method as recited in claim 11, wherein the linking of the component data sets includes comparing entries in the at least one first component data set with entries in the at least one other component data set, and, if an agreement is determined between at least one entry in the at least one first component data set and at least one entry in the at least one second component data set, creating in the at least one component link memory a component link between the at least one first component data set and the at least one second component data set.

* * * * *